(12) United States Patent
Alon et al.

(10) Patent No.: US 7,065,256 B2
(45) Date of Patent: Jun. 20, 2006

(54) METHOD FOR PROCESSING A DIGITAL IMAGE

(75) Inventors: Alex Alon, Tel Aviv (IL); Irins Alon, Tel Aviv (IL)

(73) Assignee: Dblur Technologies Ltd., Tel Aviv (IL)

( * ) Notice: Subject to any disclaimer, the term of this patent is extended or adjusted under 35 U.S.C. 154(b) by 1148 days.

(21) Appl. No.: 09/778,849

(22) Filed: Feb. 8, 2001

(65) Prior Publication Data

US 2002/0145671 A1    Oct. 10, 2002

(51) Int. Cl.
  *G06K 9/40*    (2006.01)
(52) U.S. Cl. .................. 382/264; 382/260; 382/275; 358/3.26; 358/463
(58) Field of Classification Search ............. 382/260, 382/274, 275, 279, 280, 263, 264; 358/3.26, 358/3.27, 463
See application file for complete search history.

(56) References Cited

U.S. PATENT DOCUMENTS

| | | | |
|---|---|---|---|
| 4,532,548 A | 7/1985 | Zwirn | |
| 5,023,641 A | 6/1991 | Merrick | |
| 5,535,291 A | 7/1996 | Spencer et al. | |
| 5,580,728 A * | 12/1996 | Perlin .......................... | 435/6 |
| 5,748,491 A * | 5/1998 | Allison et al. ............... | 702/22 |
| 5,867,410 A * | 2/1999 | Smallcombe et al. ....... | 708/300 |
| 6,240,219 B1 | 5/2001 | Gregory | |
| 6,333,990 B1 * | 12/2001 | Yazici et al. ................ | 382/132 |
| 6,545,714 B1 | 4/2003 | Takada | |
| 6,567,570 B1 * | 5/2003 | Steinle et al. ............... | 382/312 |
| 2002/0145671 A1 | 10/2002 | Alon et al. | |

FOREIGN PATENT DOCUMENTS

| | | |
|---|---|---|
| EP | 0 466 277 | 1/1992 |
| EP | 1 079 612 | 2/2001 |

OTHER PUBLICATIONS

Patent abstract of Japanese Patent No. JP 2000 244799.

* cited by examiner

*Primary Examiner*—Samir Ahmed
(74) *Attorney, Agent, or Firm*—Browdy & Neimark, PLLC

(57) ABSTRACT

A method and system for processing a distorted digital image B that is a convolution of an undistorted image F and a point spread function. Noise is removed from the image B so as to produce an image B' of reduced noise. The image F is then obtained based upon a calculation involving the image B'.

18 Claims, 4 Drawing Sheets

METHOD FOR PROCESSING A DIGITAL IMAGE

FIELD OF THE INVENTION

This invention relates to methods for processing a digital image.

BACKGROUND OF THE INVENTION

Global distortion, or blurring, of a picture can arise from various factors such as distortion due to out-of-focus optics and linear translation or shaking of the camera during the exposure time.

Blurring of a digital image may be described by means of a convolution:

$$B_0(x) = \int dx' F(x') h(x-x') \quad (1)$$

where $B_0(x)$ is the intensity of the pixel at the address $x=(x,y)$ in the distorted picture, x being a two-dimensional vector, $F(x)$ is the intensity of the pixel x in the undistorted image, and $h(x)$ is the so-called point spread function (PSF) that describes the distortion. The function $B_0(x)$ is typically obtained as the output from a digital camera. The PSF for an image distorted by out-of-focus optics, for example, can be described in a first approximation by a function h that is constant inside a circle of radius r and $h(x)=0$ outside the circle.

Rectifying a distorted image involves determining the function F given the functions $B_0$ and h. The convolution (1) can be Fourier transformed to yield $$\tilde{B}_0(q) = \tilde{F}(q) \cdot \tilde{h}(q) \quad (2)$$

where "~" represents the Fourier transform. Hence, $$\tilde{F}(q) = \frac{\tilde{B}_0(q)}{\tilde{h}(q)} \quad (3)$$

In principle, therefore, $F(x)$ may be obtained from the inverse Fourier transform of $\tilde{B}(q)/\tilde{h}(q)$. In practice, however, this solution is characterized by a very low signal-to-noise ratio (SNR), due to amplification of noise at frequencies q at which $\tilde{h}(q)$ is very small.

SUMMARY OF THE INVENTION

In the following description and set of claims, two explicitly described, calculable or measurable variables are considered equivalent to each other when the two variables are substantially proportional to each other.

The present invention provides a method for rectifying a distorted digital image $B_0(x)$ to produce a rectified image $F(x)$. In accordance with the invention, noise is removed from the function $\tilde{B}_0(q)$ before applying the inverse Fourier transform to the right side of equation. (3). A noise function N is used to evaluate the amount of noise for functions $\tilde{B}(q)$ that deviate slightly from $\tilde{B}_0(q)$ and a new function $\tilde{B}(q)$ is selected that deviates slightly from $\tilde{B}_0(q)$ and that minimizes the noise function N. In a preferred embodiment of the invention, the noise N in an image $B(x)$ is obtained based upon a calculation involving the gradient of the function P obtained by inverse Fourier transform of $\tilde{B}(q)/\tilde{h}(q)$. In a most preferred embodiment, the noise N is calculated according to the equation:

$$N = \int \nabla P(x) \cdot \nabla P'(x) dx \quad (4)$$

where "*" indicates complex conjugate. Equation (4) may be written in the equivalent form $$N = \int dq \cdot q^2 \|\tilde{D}(q)\|^2 \cdot \|\tilde{B}_0(q)\|^2 \quad (4)$$

where $D(x)$ is the so-called deconvolution filter (DCF) defined as $1/h(x)$, wherein $h(x)$ is the point spread function characteristic of the distortion, and q is a two-dimensional vector in Fourier space. The rectified image $F(x)$ may then be obtained by calculating the inverse Fourier transform of the right side of equation (3) using the thus obtained $B(x)$. However, a pattern characteristic of the DCF may have been superimposed on the obtained $F(x)$. This pattern originates in the DCF and is correlated with it. In the most preferred embodiment, this pattern is removed.

The invention thus concerns a method for processing a digital image $B_1$, the image $B_1$ being a convolution of an image F and a point spread function h, comprising removing noise from the image $B_1$ so as to produce an image B' of reduced noise, and calculating F based upon B'.

The invention further concerns a method for processing a deconvoluted image B, the image B having been deconvoluted according to a deconvolution filter D, the method comprising reducing correlation between the image and the deconvolution filter.

Yet still further the invention concerns a method for processing a digital image $B_1$, the image $B_1$ being a convolution of an image F and a point spread function h comprising the steps of:

(a) removing noise from the image $B_1$ so as to produce an image B' of reduced noise;
(b) obtaining function $\tilde{P}_1(q)$ according to the algebraic expression $\tilde{P}_1(q) = \tilde{B}'(q)/\tilde{h}(q)$;
(c) reducing correlation between $\tilde{P}_1$ and $1/\tilde{h}$ so as to product a function $\tilde{P}'$ of reduced correlation; and
obtaining a rectified image F by inverse Fourier transform of $\tilde{P}'(q)$.

By yet still another aspect the invention concerns a method for obtaining a radius r of a point spread function h describing an out-of-focus distortion of a digital image B, the method comprising a step of calculating a gradient at a plurality of pixels in the image B.

By a further aspect the invention concerns a program storage device readable by machine, tangibly embodying a program of instructions executable by the machine to perform method steps for processing a digital image $B_1$, the image $B_1$ being a convolution of an image F and a point spread function h, comprising removing noise from the image $B_1$ so as to produce an image B' of reduced noise, and calculating F based upon B'.

Further the invention concerns a program storage device readable by machine, tangibly embodying a program of instructions executable by the machine to perform method steps for processing a deconvoluted image B, the image B having been deconvoluted according to a deconvolution filter D, the method comprising reducing correlation between the image and the deconvolution filter.

Yet still further the invention concerns a program storage device readable by machine, tangibly embodying a program of instructions executable by the machine to perform method steps for processing a digital image $B_1$, the image $B_1$ being a convolution of an image F and a point spread function h comprising the steps of.

(a) removing noise from the image $B_1$ so as to produce an image B' of reduced noise;
(b) obtaining function $\tilde{P}_1(q)$ according to the algebraic expression $\tilde{P}_1(q) = \tilde{B}'(q)/\tilde{h}(q)$;

(c) reducing correlation between $\tilde{P}_1$ and $\tilde{I}/h$ so as to product a function $\tilde{P}'$ of reduced correlation; and (d) obtaining a rectified image F by inverse Fourier transform of $\tilde{P}'(q)$.

Further the invention concerns a program storage device readable by machine, tangibly embodying a program of instructions executable by the machine to perform method steps for obtaining a radius r of a point spread function h describing an out-of-focus distortion of a digital image B, the method comprising a step of calculating a gradient at a plurality of pixels in the image B.

BRIEF DESCRIPTION OF THE DRAWINGS

In order to understand the invention and to see how it maybe carried out in practice, a preferred embodiment will now be described, by way of non-limiting example only, with reference to the accompanying drawings, in which.

DETAILED DESCRIPTION OF A PREFERRED EMBODIMENT

Figure 4:
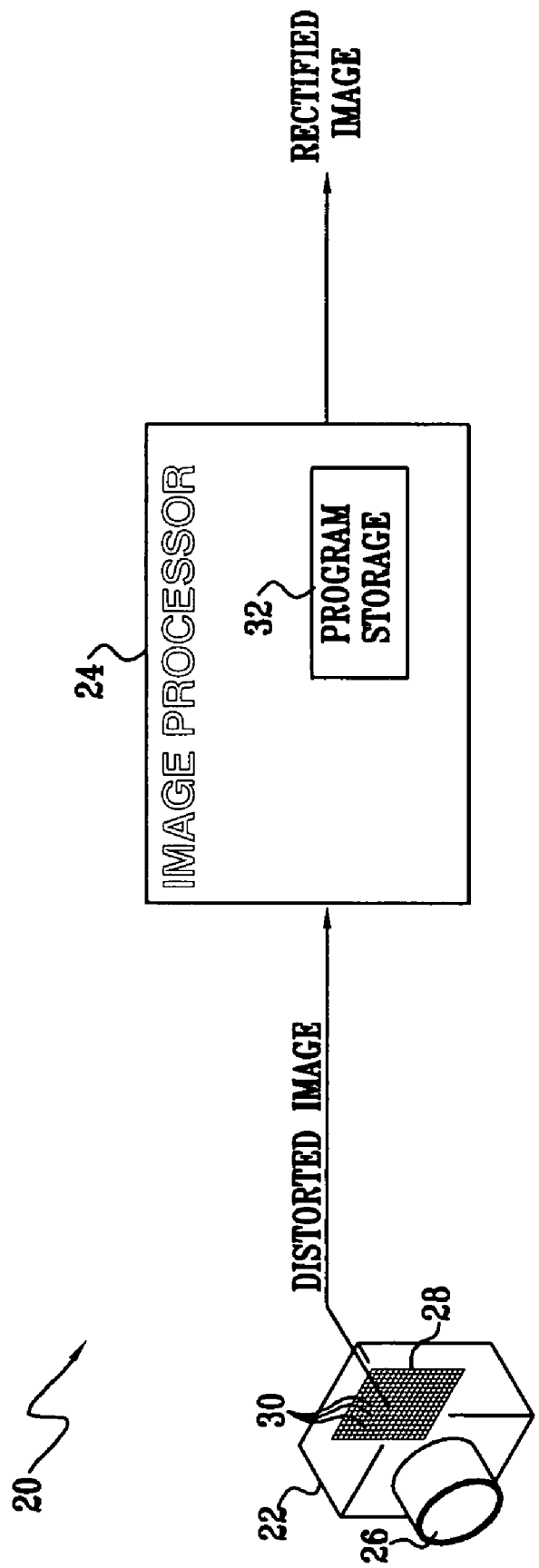
FIG. 4 shows a system for digital image processing in accordance with an embodiment of the invention.

In a preferred embodiment, as shown in FIG. 4, a system 20 for digital image processing comprises a camera 22 and an image processor 24 (which may be a separate unit as shown or may be integrated in the camera). The camera typically comprises objective optics 26, having a certain point spread function (PSF). Optics 26 focus an image onto an image sensor 28, comprising multiple pixels 30. Image sensor 28 outputs an image that is distorted, for reasons explained below. Digital image processor 24 processes the image to remove noise and distortion. The image processor may comprise a programmable processor, which operates in accordance with program instructions stored in a program storage device 32. Prior to removing noise from the distorted image $B_0(x)$, the function $B_0(x)$ is preprocessed as follows. Firstly, if the output signal B(x) from the digital camera is not linear with the input intensities I(x), the image $B_0(x)$ is transformed to make the signal linear with the intensity. This is accomplished by applying to the signal $B_0(x)$ the inverse transformation that was applied by the camera to the intensities in order to produce the signal B(x). For example, if the camera performs a transformation on the intensity of the form $B(x)=A(A^{-1}I(x))^\gamma$, where A is a scaling factor and $\gamma$ a fixed exponent, the signal $B_0(x)$ is transformed by $A(B_0(x)/A)^{\gamma^{-1}}$ to obtain a new B(x). For many digital cameras, $\gamma=\frac{1}{3}$ in order to make the obtained image more pleasing to the eye. The function B(x) is then transformed so as to decay smoothly at the edges to zero in order to make the image periodic at the edges. The function $B_1(x)$ produced by this preprocessing is operated on in accordance with the invention as described in detail below.

In accordance with the invention, a noise function N is used to evaluate the amount of noise for functions $\tilde{B}(q)$ that deviate slightly from $\tilde{B}_1(q)$ and a new function $\tilde{B}(q)$ is selected that deviates slightly from $\tilde{B}_1(q)$ and that minimizes the noise function N. In a preferred embodiment of the invention, the noise N in an image $\tilde{B}(q)$ is obtained based upon a calculation involving the gradient of the function P obtained by inverse Fourier transform of $\tilde{B}(q)/\tilde{h}(q)$. In a most preferred embodiment, the noise N is calculated according to the equation:

$$N = \int \nabla P(x) \cdot \nabla^*(x) dx$$

or equivalently, $N = \int dq \cdot q^2 \|\tilde{D}(q)\|^2 \cdot \|\tilde{B}(q)\|^2$ (4)

where D(x) is the deconvolution filter defined as 1/h (x), where h(x) is the point spread function characteristic of the distortion.

A function B(x) of essentially minimal noise that deviates only slightly from $B_1(x)$ may be found by evaluating the variation of N with respect to $B^*(q)$, $(\partial N/\partial \tilde{B}^*(q))$. For example, a sequence of functions $\tilde{B}_1(q)$ may be generated iteratively by:

$$\tilde{B}_{i+1}(q) = \tilde{B}_i(q) - \varepsilon \frac{\partial N}{\partial \tilde{B}_i * (q)}.$$

In the most preferred embodiment, N is given by (4) so that $$\tilde{B}_{i+1}(q) = \tilde{B}_i(q) - \varepsilon \frac{\partial N}{\partial \tilde{B}_i * (q)} = \tilde{B}_i(q) - \varepsilon \tilde{B}_i(q) \cdot \|\tilde{D}(q)\|^2 \cdot q^2 = \tilde{B}_i(q)(1 - \varepsilon \|\tilde{D}(q)\|^2 q^2). \quad (5)$$

Thus in the most preferred embodiment, (N given by (4)), for finite $\alpha$, i=n for large n, and $\epsilon=\alpha/n$, $\tilde{B}_n(q)$ is given by:

$$\tilde{B}_n(q) = \tilde{B}_1(q)\left(1 - \frac{\alpha}{n}\|\tilde{D}(q)\|^2 q^2\right)^n,$$

and in the limit, $$\tilde{B}_\alpha(q) = \lim_{n \to \infty} \tilde{B}_1(q)\left(1 - \frac{\alpha}{n}\|\tilde{D}(q)\|^2 q^2\right)^n = \tilde{B}_1(q)e^{-\alpha\|\tilde{D}(q)\|^2 q^2} \quad (6)$$

$\tilde{B}_\alpha(q)$ is preferably multiplied by a factor so that it acquires the same norm as $\tilde{B}_1(q)$ to produce a function $\tilde{B}(q)$ and a new function $\tilde{P}_1(q)=\tilde{B}(q)/\tilde{h}(q)$ is then obtained.

F(x) may now be obtained by inverse Fourier transform of $\tilde{P}_1(q)$. However, a pattern characteristic of the DCF may have been superimposed on $\tilde{P}_1(q)$. This pattern originates in the DCF and is correlated with it. In the most preferred embodiment, this pattern is removed from the function $\tilde{P}_1(q)$ before applying the inverse Fourier transform and return to x-space.

In order to remove this pattern, the correlation between the pattern and the DCF is decreased, An overall correlation function C is used to evaluate the correlation between the DCP and $\tilde{P}(q)$ for functions $\tilde{P}(q)$ that deviate slightly from $\tilde{P}_1(q)$ and a new function $\tilde{P}(q)$ is selected that deviates slightly from $\tilde{P}_1(q)$ and that minimizes the correlation function C. In a preferred embodiment of the invention, the correlation C between the DCF and a function $\tilde{P}(q)$ is calculated according to the equation:

$$C = \int dq \|\tilde{D}(q)\|^2 \cdot \|\tilde{P}(q)\|^2 \quad (7)$$

The variation of C with respect to $\tilde{P}^*(q)$, $\partial C/\partial \tilde{P}^*$ is used to change $\tilde{P}(q)$ in order to reduce C. for example, a sequence of functions $\tilde{P}i (q)$ may be generated iteratively by:

$$\tilde{P}i+1(q) = \tilde{P}i(q) - \varepsilon \frac{\partial C}{\partial \tilde{P}^*(q)}.$$

In the most preferred embodiment, C is given by (7) so that $$\tilde{P}_{i+1}(q) =$$

$$\tilde{P}_i(q) - \varepsilon \frac{\partial C}{\partial \tilde{P}^*(q)} = \tilde{P}_i(q) - \varepsilon \cdot \tilde{P}_i(q) \cdot \|\tilde{D}(q)\|^2 = \tilde{P}_i(q)(1 - \varepsilon \|\tilde{D}(q)\|^2),$$

Thus, in the most preferred embodiment (C given by (7)), for finite $\beta$, i=n for large n, and $\epsilon = \beta/n$, $$\tilde{P}_{n+1}(q) = \tilde{P}_1(q)\left(1 - \frac{\beta}{n}\|\tilde{D}(q)\|^2\right)^n \quad (8)$$

and in the limit, $$\tilde{P}_\beta(q) = \lim_{n \to \infty} \tilde{P}_1(q)\left(1 - \frac{\beta}{n}\|\tilde{D}(q)\|^2\right)^n = \tilde{P}_1(q)e^{-\beta\|\tilde{D}(q)\|^2} \quad (9)$$

$\tilde{P}_\beta(q)$ is multiplied by a factor to produce a $\tilde{P}(q)$ having the same norm as $\tilde{P}_1(q) \cdot F(x)$ is then obtained by inverse Fourier transfer of $\tilde{P}(q)$.

After removing the superimposed pattern correction, the function F(x) may be converted from the linear intensity range to an intensity space suited for the eye. However, where the original $B_0(x)$ was near 0, the slope of $B_0(x)$ was very steep so that when values of $B_0(x)$ near 0 are converted for discrete representation, much information is lost. Thus, despite the fact that the resolution of the data is nominally 8 bit, with dark colors (corresponding to low values of B), the resolution of the data is equivalent to 3 bit.

Because much information has been lost in the dark regions, converting F(x) to an intensity space suited for the eye is preferably not performed simply by applying the inverse of the transformation previously applied by the camera to B(x) in order to convert it to the linear range. Instead, image F(x) is preferably first mapped into an interval, and then the inverse transformation is applied Thus, for example, if the transformation $A(B(x)/A)^{\gamma^{-1}}$ was applied to B(x) by the camera, F(x) is mapped linearly into the interval [0,255] and the transformation $A(F(x)/A)^\gamma$ is applied to the function F(x). For the obtained image, a histogram is obtained from which a cut-off value is obtained at which a predetermined fraction of pixels, for example 10% of the pixels in the image have an intensity value less than or equal to this cut-off value. The intensities are then linearly remapped so that 255 is mapped to 255, the cut-off value is mapped to 25 (10% of 255), and intensity values between 0 and the cut-off are mapped to zero.

The PSF for an image distorted by out-of-focus optics can be described in a first approximation by a function h that is constant inside a circle of radius r and h(x)=0 outside the circle. The radius r may be determined from a distorted image B(x) by the following algorithm. The algorithm makes use of the fact that in an unfocused picture, boundaries (referred to herein as "steps") are gradual and not abrupt.

A step parallel to the y-axis at $x=x_0$ of an image is described by a Heaviside function $\Theta(x-x_0)$ independent of y. The mathematical description of the removal from focus of this step is then given by:

$$I(x) = \int dx'dy' h(x-x',y-y')\Theta(x'-x_0)$$

where the intensity I in the vicinity of the step is independent of y and h(x,y) is the PSF function. Integration with respect to y yields $$I(x) = \int dx'\Theta(x'-x_0)\int d(y-y')h(x-x',y-y') =$$

$$\int dx'\Theta(x'-x_0)\frac{2\sqrt{r^2-(x-x')^2}}{\pi r^2}.$$

The slope of the step at $x=x_0$ is $$\left.\frac{dI(x)}{dx}\right|_{x=x_0} = \frac{d}{dx}\int dx'\Theta(x'-x_0)\frac{2\sqrt{r^2-(x-x')^2}}{\pi r^2}\bigg|_{x=x_0}$$

$$= \int dx'\Theta(x'-x_0)\frac{d}{dx}\left(\frac{2\sqrt{r^2-(x-x')^2}}{\pi r^2}\right)\bigg|_{x=x_0} =$$

$$= -\int dx'\Theta(x'-x_0)\frac{d}{dx'}\left(\frac{2\sqrt{r^2-(x_0-x')^2}}{\pi r^2}\right)$$

$$= \int dx'\left(\frac{d\Theta(x'-x_0)}{dx'}\right)\frac{2\sqrt{r^2-(x_0-x')^2}}{\pi r^2}$$

$$= \int dx'\delta(x'-x_0)\frac{2\sqrt{r^2-(x_0-x)^2}}{\pi r^2} = \frac{2r}{\pi r^2} = \frac{2}{\pi r}$$

In accordance with the invention, r is found by determining the slope s(x) at each pixel x where a step exists in the image $B_1(x)$, where s is defined as the absolute value of the gradient of $B_1(x)$ divided by the height of the step at x. The radius r(x) at x is $$r(x) = \frac{2}{\pi s(x)}$$

Edges in the image $B_1(x)$ are detected by any method of edge detection as is known in the art, for example, as disclosed in Crane, R., "*Simplified Approach to Image Processing, A: Classical and Modern Techniques in C*"; Chapter 3. Prentice Hall, 1996, Calculated radii r(x) for pixels x at an edge in the image $B_1(x)$ are normalized by dividing by the height of the step at the edge. The normalized radii are arranged in a histogram. The radius of the PSF is obtained essentially equal to the radius of maximum frequency in the histogram.

EXAMPLE

Figure 1:
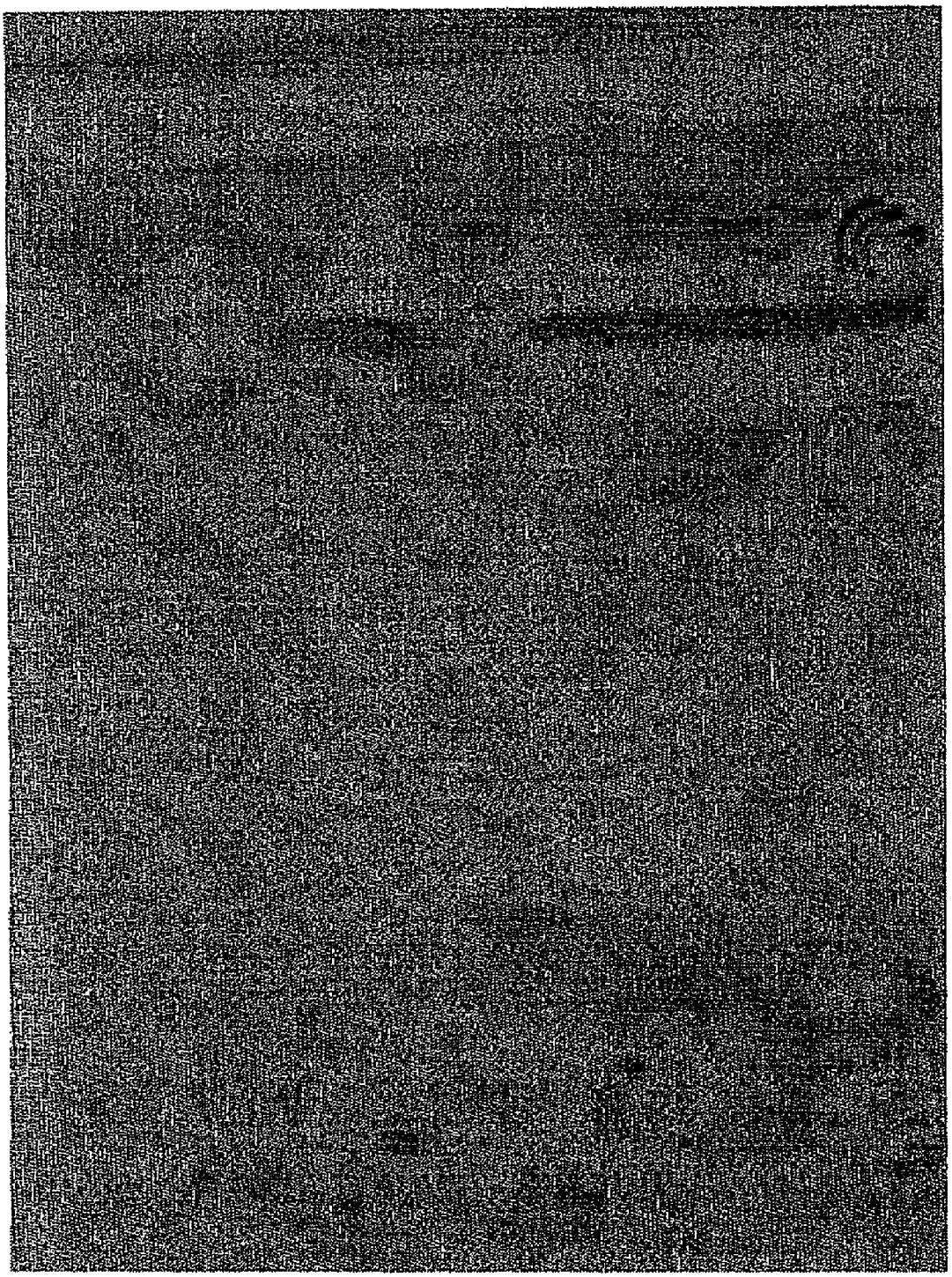
FIG. 1 shows a digital image showing distortion due to out of focus optics.

FIG. 1 shows an image that is blurred due to out-of focus optics. This image was rectified in accordance with the invention as follows.

Figure 2:
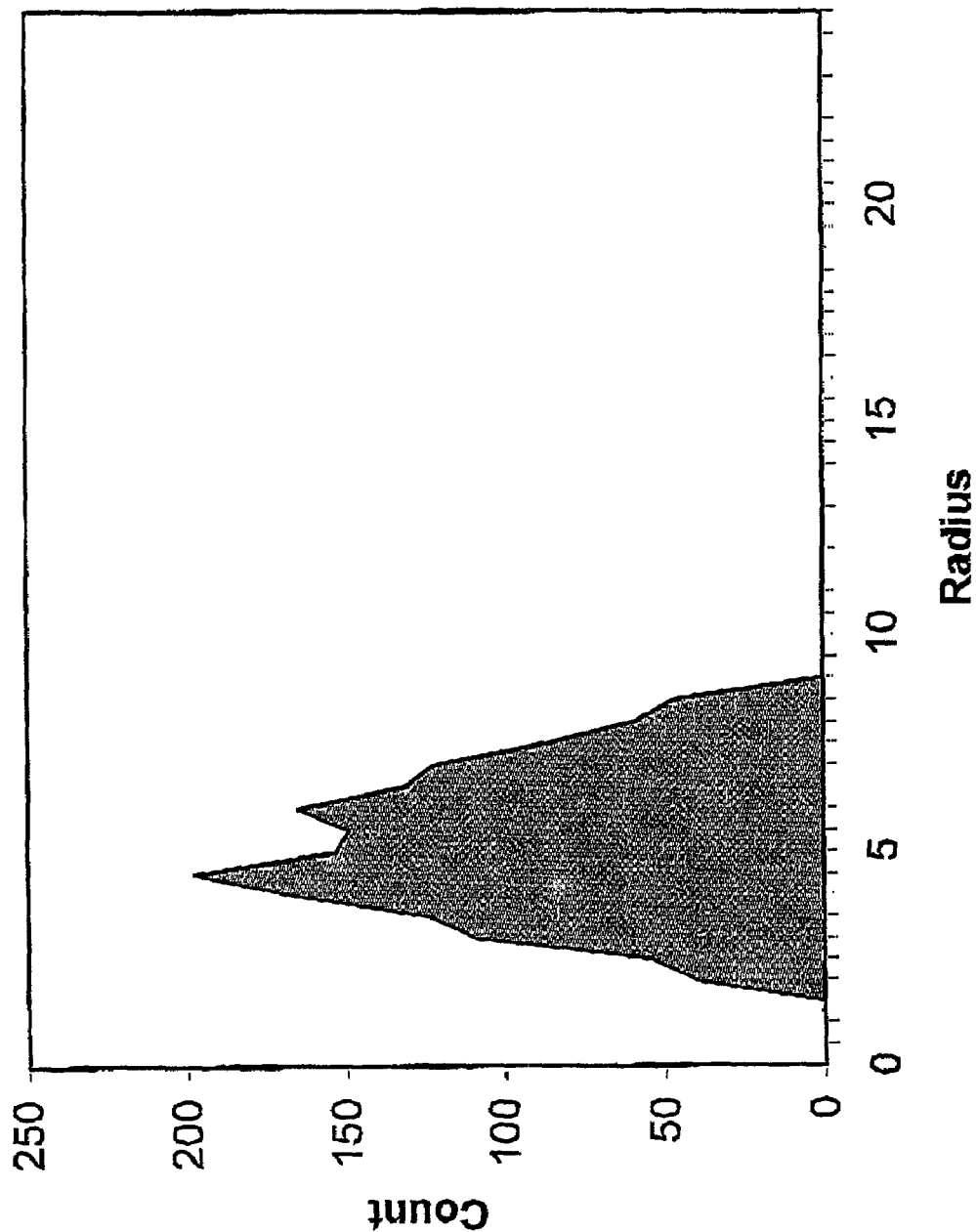
FIG. 2 shows a histogram of heights of steps in the image of FIG. 1.

The radius of the PSF of the distortion was first found as follows. Edges in the image were detected and radius r(x)

was calculated for each pixel x located at an edge as described above. Each calculated radius was normalized by dividing it by the height of the step at x. FIG. 2 shows a histogram of the normalized heights. As can be seen in FIG. 2, the radius of maximum frequency of the histogram was found to be 4 pixels, and this was taken as the radius of the PSF of the distortion.

Figure 3:
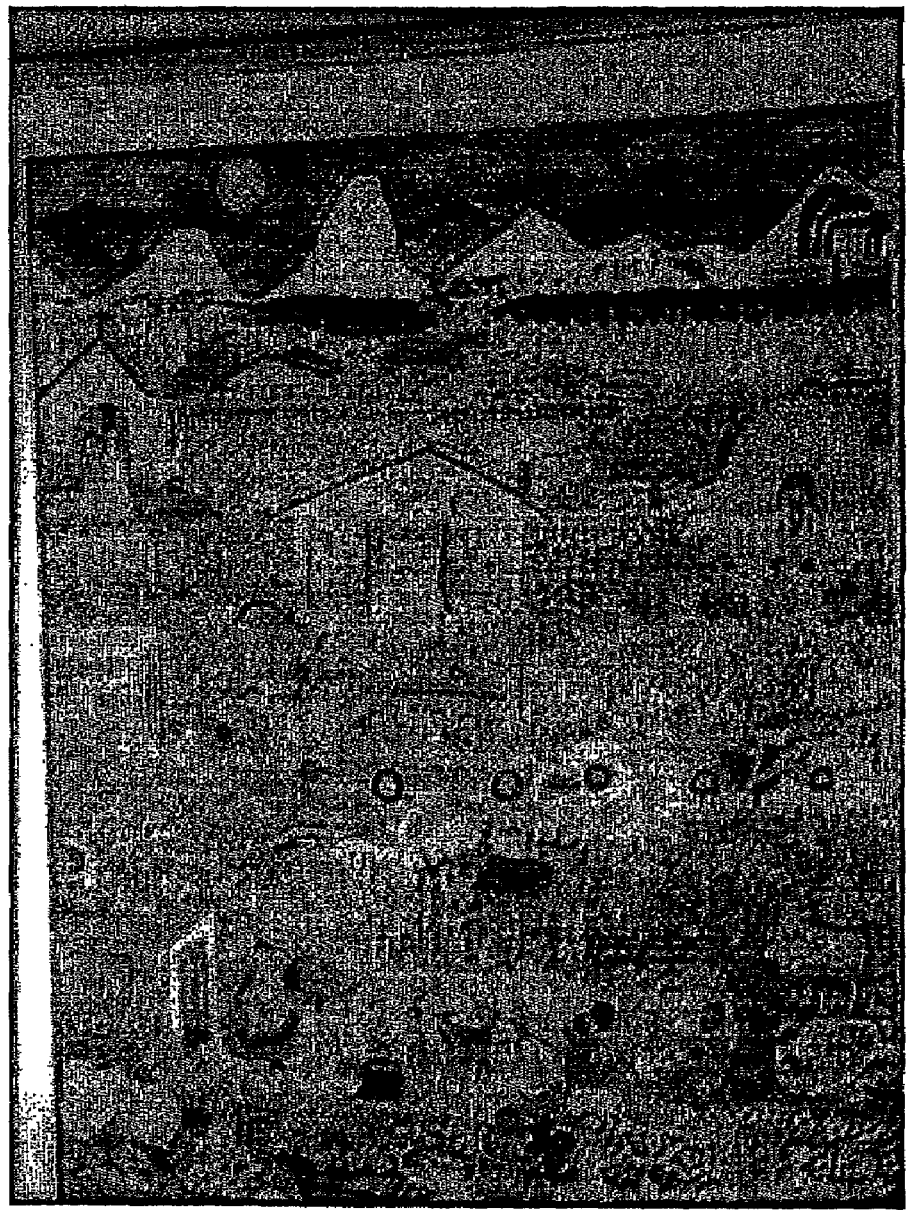
FIG. 3 shows the result of rectifying the image of FIG. 1 in accordance with the invention.

$\tilde{B}_\alpha(q)$ was then obtained according to equation (6) using $\alpha=0.001$, and then normalized so as to have the same norm as $\tilde{B}_1(q)$, A function $\tilde{P}_1(q)$ was then obtained by applying the right side of equation (3) using $\tilde{B}_\alpha(q)$ for $\tilde{B}_0(q) \cdot \tilde{P}_\beta(q)$ was then obtained according to equation (9) using $\beta=0.01$, and then normalized so as to have the same norm as $\tilde{P}_1(q)$. The function $F(x)$ was then obtained by inverse Fourier transform of $\tilde{P}_1(q)$. The rectified image $F(x)$ is shown in FIG. 3.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method for processing a digital image $B_1$, the image $B_1$ being a convolution of an image F and a point spread function h, comprising removing noise from the image $B_1$ so as to produce an image B' of reduced noise, and calculating F based upon B',
wherein an amount of noise is calculated in a plurality of images B, and the image B' is selected as an image of essentially minimal noise among the images B.

2. A method for processing a digital image $B_1$, the image $B_1$ being a convolution of an image F and a point spread function h, comprising removing noise from the image $B_1$ so as to produce an image B' of reduced noise, and calculating F based upon B',
wherein the amount of noise in an image is calculated using an algebraic expression involving the gradient of a function $P(x)$ obtained by inverse Fourier transform of $\tilde{B}(q)/\tilde{h}(q)$.

3. The method of claim 2, wherein the amount of noise N in an image B is calculated according to the algebraic expression $N=\int \nabla P(x) \cdot \nabla P^*(x) dx$, wherein $\Delta$ indicates the gradient and "*" indicates complex conjugate.

4. The method according to claim 3 wherein $\tilde{B}'(q)$, the Fourier transform of B', is equal to $\tilde{B}_{i+1}(q)$ for some integer i, where $\tilde{B}_{i+1}(q)$ is obtained according to the algebraic expression $\tilde{B}_{i+1}(q)=\tilde{B}_1(q)(1+\epsilon\|\tilde{D}(q)\|^2 q^{-2})^i$, where $\epsilon$ is a small positive number.

5. The method according to claim 3 wherein $\tilde{B}'(q)$ is obtained according to the algebraic expression $\tilde{B}'(q)=\tilde{B}^1(q)e^{-\alpha\|\tilde{D}(q)\|^2 q^2}$, where $\alpha$ is a predetermined constant, and $\tilde{D}(q)$ is the Fourier transform of 1/h.

6. A method for processing a digital image $B_1$, the image $B_1$ being a convolution of an image F and a point spread function h, comprising removing noise from the image $B_1$ so as to produce an image B' of reduced noise, and calculating F based upon B',
wherein calculating F involves calculating an inverse Fourier transform of the algebraic expression $\tilde{B}(q)/\tilde{h}(q)$. wherein $\tilde{B}'(q)$ is the Fourier transform of the image B' of reduced noise, and $\tilde{h}(q)$ is the Fourier transform of h.

7. A method for processing a deconvoluted image B, the image B having been deconvoluted according to a deconvolution filter D, the method comprising reducing correlation between the image and the deconvolution filter,
wherein an amount of correlation is calculated in a plurality of images P, and an image P' is selected among the images P as an image having essentially minimal correlation with the deconvolution filter.

8. The method of claim 7 wherein the amount of correlation C in an image P is calculated according to the algebraic expression $C=\int dq \|\tilde{D}(q)\|^2 \cdot \|\tilde{P}(q)\|^2$ wherein $\tilde{P}(q)$ is the Fourier transform of an image P.

9. The method of claim 7 wherein $\tilde{P}'(q)$, the Fourier transform of P', is equal to $\tilde{P}_{i+1}(q)$ for some integer i, where $\tilde{P}_{i+1}(q)$ is obtained according to the algebraic expression $\tilde{P}_{i+1}(q)=\tilde{P}_1(q)(1+\epsilon\|\tilde{D}(q)\|^2)^i$, where $\epsilon$ is a small positive number.

10. The method of claim 7 wherein $\tilde{P}'(q)$ is obtained according to the algebraic expression e,otl $\tilde{P}'(q)=\tilde{P}_1(q)e^{-\beta\|\tilde{D}(q)\|^2}$, where $\beta$ is a predetermined constant.

11. A method for processing a digital image $B_1$, the image $B_1$ being a convolution of an image F and a point spread function h comprising the steps of:
removing noise from the image $B_1$ so as to produce an image B' of reduced noise;
obtaining function $\tilde{P}_1(q)$ according to the algebraic expression $\tilde{P}_1(q)=\tilde{B}'(q)/\tilde{h}(q)$;
reducing correlation between $\tilde{P}_1$ and $1/\tilde{h}$ so as to product a function $\tilde{P}'$ of reduced correlation; and
obtaining a rectified image F by inverse Fourier transform of $\tilde{P}'(q)$.

12. A method for obtaining a radius r of a point spread function h describing an out-of-focus distortion of a digital image B, the method comprising a step of calculating a gradient at a plurality of pixels in the image B, in which a radius $r(x)$ is calculated at each of the plurality of pixels based upon the gradient.

13. The method according to claim 12 wherein each of the plurality of pixels is located at an edge of the image B.

14. The method according to claim 12 wherein a radius $r(x)$ is inversely proportional to the gradient at x.

15. The method according to claim 13 wherein r is obtained as the $r(x)$ having an essentially maximal frequency among the calculated radii $r(x)$.

16. The method according to claim 15 wherein a radius $r(x)$ is calculated according to the algebraic expression $r(x)=2/\pi s(x)$, wherein $s(x)$ is the absolute value of the gradient of B at x normalized by dividing by the height of the edge at x.

17. A method for processing a digital image $B_1$, the image $B_1$ being a convolution of an image F and a point spread function h, comprising removing noise from the image $B_1$ so as to produce an image B' of reduced noise, and calculating F based upon B',
further comprising a step of producing the image B' from an image $B_0$, where the image $B_0$ was obtained using a digital camera that applies a transformation to a light level detected at a pixel, the transformation having an inverse, wherein $B_1$ is obtained from the image $B_0$ by applying to the image $B_0$ the inverse transformation.

18. A program storage device readable by machine, tangibly embodying a program of instructions executable by the machine to perform method steps for processing a digital image $B_1$, the image $B_1$ being a convolution of an image F and a point spread function h, comprising the steps of:
removing noise from the image $B_1$ so as to produce an image B' of reduced noise;
obtaining function $\tilde{P}_1(q)$ according to the algebraic expression $\tilde{P}_1(q)=\tilde{B}'(q)/\tilde{h}(q)$;
reducing calculation between $\tilde{P}_1$ and $\tilde{1}/h$ so as to product a function ' of reduced correlation; and
obtaining a rectified image F by inverse Fourier transform of $\tilde{P}'(q)$.

* * * * *